US012738597B2

(12) United States Patent
Tomita et al.

(10) Patent No.: US 12,738,597 B2
(45) Date of Patent: Sep. 15, 2026

(54) INGREDIENT FOR SECONDARY CELL SEPARATOR COATING MATERIAL, SECONDARY CELL SEPARATOR COATING MATERIAL, SECONDARY CELL SEPARATOR, METHOD FOR PRODUCING SECONDARY CELL SEPARATOR, AND SECONDARY CELL

(71) Applicant: MITSUI CHEMICALS, INC., Tokyo (JP)

(72) Inventors: Yoshihiko Tomita, Ichihara (JP); Tsuyoshi Matsumoto, Kisarazu (JP); Yasuyuki Kagawa, Ichihara (JP); Toshihiro Yoshimura, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 636 days.

(21) Appl. No.: 17/918,783

(22) PCT Filed: Apr. 9, 2021

(86) PCT No.: PCT/JP2021/014979
§ 371 (c)(1),
(2) Date: Oct. 13, 2022

(87) PCT Pub. No.: WO2021/210498
PCT Pub. Date: Oct. 21, 2021

(65) Prior Publication Data

US 2023/0146327 A1 May 11, 2023

(30) Foreign Application Priority Data

Apr. 17, 2020 (JP) ................................ 2020-074279

(51) Int. Cl.
*H01M 50/42* (2021.01)
*H01M 50/431* (2021.01)
*H01M 50/449* (2021.01)

(52) U.S. Cl.
CPC ......... *H01M 50/42* (2021.01); *H01M 50/431* (2021.01); *H01M 50/449* (2021.01)

(58) Field of Classification Search
CPC .. H01M 50/42; H01M 50/431; H01M 50/449; H01M 10/052; H01M 10/0525; H01M 50/403; H01M 50/414; H01M 50/417; H01M 50/423; H01M 50/409; H01M 50/434; H01M 50/443; H01M 50/446; H01M 50/451; H01M 50/457; H01M 50/46; H01M 50/489; H01M 50/491; C09D 133/26; C09D 133/14; C08K 2003/2227; Y02E 60/10; C08F 220/56; C08F 222/38
See application file for complete search history.

(56) References Cited

U.S. PATENT DOCUMENTS

| | | | | |
|---|---|---|---|---|
| 2014/0161967 | A1 | 6/2014 | Hasegawa et al. | |
| 2016/0141575 | A1 | 5/2016 | Sasaki et al. | |
| 2018/0053963 | A1 | 2/2018 | Tanaka | |
| 2018/0212218 | A1* | 7/2018 | Asai | H01M 4/13 |
| 2019/0006677 | A1* | 1/2019 | Matsuo | C08K 3/00 |
| 2020/0127263 | A1 | 4/2020 | Annaka | |
| 2020/0411870 | A1* | 12/2020 | Adachi | H01M 4/622 |

FOREIGN PATENT DOCUMENTS

| | | | | |
|---|---|---|---|---|
| JP | 2013-46901 | A | 3/2013 | |
| JP | 2015118908 | A | 6/2015 | |
| JP | 2020-87591 | A | 6/2020 | |
| KR | 20180127335 | A | 11/2018 | |
| KR | 20190137818 | A | 12/2019 | |
| WO | 2017/026095 | A1 | 2/2017 | |
| WO | WO-2019188722 | A1 * | 10/2019 | C08F 220/56 |

* cited by examiner

*Primary Examiner* — Daniel S Gatewood
(74) *Attorney, Agent, or Firm* — RANKIN, HILL & CLARK LLP

(57) ABSTRACT

In an ingredient for a secondary cell separator coating material including a water-soluble polymer having a repeating unit derived from methacrylamide and a repeating unit derived from a carboxy group-containing vinyl monomer, a content ratio of the repeating unit derived from the methacrylamide is 60% by mass or more and 97% by mass or less, and a content ratio of the repeating unit derived from the carboxy group-containing vinyl monomer is 3% by mass or more and 40% by mass or less with respect to the total amount of the water-soluble polymer; a weight average molecular weight of the water-soluble polymer is 20000 or more and 200000 or less; and a glass transition temperature of the water-soluble polymer is 200° C. or more.

9 Claims, No Drawings

INGREDIENT FOR SECONDARY CELL SEPARATOR COATING MATERIAL, SECONDARY CELL SEPARATOR COATING MATERIAL, SECONDARY CELL SEPARATOR, METHOD FOR PRODUCING SECONDARY CELL SEPARATOR, AND SECONDARY CELL

TECHNICAL FIELD

The present invention relates to an ingredient for a secondary cell separator coating material, a secondary cell separator coating material, a secondary cell separator, a method for producing a secondary cell separator, and a secondary cell.

BACKGROUND ART

Conventionally, a secondary cell is equipped with a separator for separating a positive electrode from a negative electrode, and allowing ions in an electrolytic solution to pass through.

As such a separator, for example, a polyolefin porous film has been known.

Since a short circuit may occur between the positive electrode and the negative electrode when the separator changes its shape due to shrinkage by heat, heat resistance is required for the separator. Therefore, a heat-resistant coating layer may be provided in the separator.

As the heat-resistant coating layer formed in the separator, for example, a coating layer obtained by coating a coating slurry containing a binder resin and a filler onto a porous film to be dried has been known. More specifically, the heat-resistant layer obtained by coating a coating slurry containing sodium carboxymethyl cellulose (CMC) and alumina onto a substrate porous film obtained from a polyolefin resin composition to be dried has been proposed (ref: for example, Patent Document 1 (Examples)).

CITATION LIST

Patent Document

Patent Document 1: Japanese Unexamined Patent Publication No. 2013-46901

SUMMARY OF THE INVENTION

Problem to be Solved by the Invention

On the other hand, since a separator for a secondary cell needs to allow ions to pass through for power generation, air permeability is required. However, there is a problem that the above-described heat-resistant layer decreases the air permeability of the separator.

The present invention provides an ingredient for a secondary cell separator coating material which is capable of obtaining a secondary cell separator having both excellent heat resistance and excellent air permeability, a secondary cell separator coating material including the ingredient for a secondary cell separator coating material, a secondary cell separator including a coating film of the secondary cell separator coating material, a method for producing a secondary cell separator, and a secondary cell including the secondary cell separator.

Means for Solving the Problem

The present invention [1] includes an ingredient for a secondary cell separator coating material including a water-soluble polymer having a repeating unit derived from methacrylamide and a repeating unit derived from a carboxy group-containing vinyl monomer, wherein a content ratio of the repeating unit derived from the methacrylamide is 60% by mass or more and 97% by mass or less, and a content ratio of the repeating unit derived from the carboxy group-containing vinyl monomer is 3% by mass or more and 40% by mass or less with respect to the total amount of the water-soluble polymer; a weight average molecular weight of the water-soluble polymer is 20000 or more and 200000 or less; and a glass transition temperature of the water-soluble polymer is 200° C. or more.

The present invention [2] includes a secondary cell separator coating material including the ingredient for a secondary cell separator coating material described in the above-described [1].

The present invention [3] includes the secondary cell separator coating material described in the above-described [2] further including an inorganic filler and a dispersant.

The present invention [4] includes a secondary cell separator including a porous film and a coating film of the secondary cell separator coating material described in the above-described [2] or [3] disposed on at least one surface of the porous film.

The present invention [5] includes a method for producing a secondary cell separator including a step of preparing a porous film and a step of coating the secondary cell separator coating material according to claim 2 or 3 onto at least one surface of the porous film.

The present invention [6] includes a secondary cell including a positive electrode, a negative electrode, and the secondary cell separator described in the above-described [4] disposed between the positive electrode and the negative electrode.

Effect of the Invention

The ingredient for a secondary cell separator coating material of the present invention includes a water-soluble polymer having a repeating unit derived from methacrylamide and a repeating unit derived from a carboxy group-containing vinyl monomer at a predetermined ratio, and a weight average molecular weight and a glass transition temperature of the water-soluble polymer are adjusted within a predetermined range. Therefore, according to the ingredient for a secondary cell separator coating material of the present invention, it is possible to obtain a secondary cell separator having excellent heat resistance and air permeability.

Since the secondary cell separator coating material of the present invention includes the above-described ingredient for a secondary cell separator coating material, it is possible to obtain a secondary cell separator having excellent heat resistance and air permeability.

The secondary cell separator of the present invention includes a coating film of the above-described secondary cell separator coating material, it has excellent heat resistance and air permeability.

According to the method for producing a secondary cell separator of the present invention, it is possible to efficiently produce a secondary cell separator having excellent heat resistance and air permeability.

Since the secondary cell of the present invention includes the above-described secondary cell separator, it has excellent heat resistance and air permeability, and as a result, it has excellent durability and power generation efficiency.

DESCRIPTION OF EMBODIMENTS

An ingredient for a secondary cell separator coating material of the present invention includes a water-soluble polymer.

The water-soluble polymer is a polymer obtained by polymerizing a raw material of the water-soluble polymer (monomer composition).

The water-soluble polymer is defined as a polymer having a residual solid content of 0.1% or less which is obtained by stirring and dissolving 1 g of polymer with respect to 100 ml of water for 24 hours to be then filtered through a 300-mesh wire net.

The raw material of the water-soluble polymer contains, as an essential component, methacrylamide and a carboxy group-containing vinyl monomer. The raw material of the water-soluble polymer preferably does not contain alkyl (meth)arylate to be described later, and contains the methacrylamide and the carboxy group-containing vinyl monomer.

The methacrylamide may be used in combination with acrylamide, or the methacrylamide may be used alone without being used in combination with the acrylamide.

From the viewpoint of improving heat resistance, preferably, the methacrylamide is not used in combination with the acrylamide, and is used alone.

A content ratio of the methacrylamide to the raw material of the water-soluble polymer is described later.

The carboxy group-containing vinyl monomer is a copolymerizable monomer which is copolymerizable with the methacrylamide and contains a carboxy group.

Examples of the carboxy group-containing vinyl monomer include monocarboxylic acid, dicarboxylic acid, or a salt of these. An example of the monocarboxylic acid includes (meth)acrylic acid. Examples of the dicarboxylic acid include itaconic acid, maleic acid, fumaric acid, itaconic anhydride, maleic anhydride, and fumaric anhydride.

The (meth)acrylic includes acrylic and methacrylic (hereinafter, the same).

These carboxy group-containing vinyl monomers may be used alone or in combination of two or more.

When the raw material of the water-soluble polymer includes the carboxy group-containing vinyl monomer, a secondary cell separator (described later) obtained by using a secondary cell separator coating material (described later) including the ingredient for a secondary cell separator coating material has excellent heat resistance.

As the carboxy group-containing vinyl monomer, preferably, monocarboxylic acid is used, more preferably, (meth) acrylic acid is used, further more preferably, methacrylic acid is used.

When the raw material of the water-soluble polymer includes these, the secondary cell separator (described later) obtained by using the secondary cell separator coating material (described later) including the ingredient for a secondary cell separator coating material has further more excellent heat resistance.

A content ratio of the carboxy group-containing vinyl monomer to the raw material of the water-soluble polymer is described later.

Further, the raw material of the water-soluble polymer may contain, as an optional component, a copolymerizable monomer which is copolymerizable with the methacrylamide and/or the carboxy group-containing vinyl monomer (hereinafter, referred to as a water-soluble and copolymerizable monomer).

Examples of the water-soluble and copolymerizable monomer include alkyl (meth)acrylate, functional group-containing vinyl monomers (excluding the carboxy group-containing vinyl monomers), vinyl esters, aromatic vinyl monomers, N-substituted unsaturated carboxylic acid amides, heterocyclic vinyl compounds, vinylidene halide compounds, α-olefins, dienes, and cross-linking vinyl monomers.

Examples of the alkyl (meth)acrylate include alkyl (meth) acrylates having an alkyl portion having 1 to 12 carbon atoms such as alkyl (meth)acrylates having an alkyl portion having 1 to 4 carbon atoms such as methyl (meth)acrylate, ethyl (meth)acrylate, isopropyl (meth)acrylate, n-butyl (meth)acrylate, isobutyl (meth)acrylate, and t-butyl (meth) acrylate and alkyl (meth)acrylates having an alkyl portion having 5 to 12 carbon atoms such as n-amyl (meth)acrylate, isoamyl (meth)acrylate, n-hexyl (meth)acrylate, 2-ethylhexyl (meth)acrylate, octyl (meth)acrylate, decyl (meth) acrylate, dodecyl (meth)acrylate, and octadecyl (meth)acrylate.

Examples of the functional group-containing vinyl monomer (excluding the carboxy group-containing vinyl monomer) include hydroxyl group-containing vinyl monomers, amino group-containing vinyl monomers, glycidyl group-containing vinyl monomers, cyano group-containing vinyl monomers, sulfonic acid group-containing vinyl monomers and a salt thereof, acetoacetoxy group-containing vinyl monomers, and phosphoric acid group-containing compounds.

Examples of the hydroxyl group-containing vinyl monomer include 2-hydroxyethyl (meth)acrylate and 2-hydroxypropyl (meth)acrylate.

Examples of the amino group-containing vinyl monomer include 2-aminoethyl (meth)acrylate, 2-(N-methylamino) ethyl (meth)acrylate, and 2-(N,N-dimethylamino)ethyl (meth)acrylate.

An example of the glycidyl group-containing vinyl monomer includes glycidyl (meth)acrylate.

An example of the cyano group-containing vinyl monomer includes (meth)acrylonitrile.

Examples of the sulfonic acid group-containing vinyl monomer include allylsulfonate, methallylsulfonate, and acrylamide t-butylsulfonate. Further, examples of the salt of the above-described sulfonic acid group-containing vinyl monomer include alkali metal salts such as sodium salt and potassium salt, and ammonium salts. Specific examples thereof include sodium allylsulfonate, sodium methallylsulfonate, and ammonium methallylsulfonate.

An example of the acetoacetoxy group-containing vinyl monomer includes acetoacetoxyethyl (meth)acrylate.

An example of the phosphoric acid group-containing compound includes 2-methacryloyloxyethyl acid phosphate.

Examples of the vinyl esters include vinyl acetate and vinyl propionate.

Examples of the aromatic vinyl monomer include styrene, α-methylstyrene, p-methylstyrene, vinyltoluene, and chlorostyrene.

An example of the N-substituted unsaturated carboxylic acid amide includes N-methylol (meth)acrylamide.

An example of the heterocyclic vinyl compound includes vinylpyrrolidone.

Examples of the vinylidene halide compound include vinylidene chloride and vinylidene fluoride.

Examples of the α-olefins include ethylene and propylene.

An example of the dienes includes butadiene.

Examples of the cross-linking vinyl monomer include vinyl monomers having two or more vinyl groups such as methylenebis(meth)acrylamide, divinylbenzene, polyethylene glycol chain-containing di(meth)acrylate, trimethylolpropane tetraacrylate, pentaerythritol triacrylate, and pentaerythritol tetraacrylate.

These water-soluble and copolymerizable monomers may be used alone or in combination of two or more.

As the water-soluble and copolymerizable monomer, preferably, a copolymerizable monomer containing a hydrophilic group is used, more specifically, a hydroxyl group-containing vinyl monomer, a sulfonic acid group-containing vinyl monomer, and a phosphoric acid group-containing vinyl monomer are used, further more preferably, a hydroxyl group-containing vinyl monomer is used.

In the raw material of the water-soluble polymer, a content ratio of the methacrylamide is, from the viewpoint of improving adsorption properties with respect to an inorganic filler to be described later and obtaining excellent heat resistance, for example, 60 parts by mass or more, preferably 70 parts by mass or more, more preferably 75 parts by mass or more, further more preferably 80 parts by mass or more, and from the viewpoint of improving adsorption properties with respect to an inorganic filler to be described later and obtaining excellent heat resistance, for example, 97 parts by mass or less, preferably 96 parts by mass or less, more preferably 95 parts by mass or less with respect to 100 parts by mass of the total amount of the raw material of the water-soluble polymer.

Further, in the raw material of the water-soluble polymer, a content ratio of the carboxy group-containing vinyl monomer is, from the viewpoint of improving adsorption properties with respect to an inorganic filler to be described later and obtaining excellent heat resistance, for example, 3 parts by mass or more, preferably 4 parts by mass or more, more preferably 5 parts by mass or more, and from the viewpoint of suppressing adsorption with respect to a substrate to be described later and obtaining excellent air permeability, for example, 40 parts by mass or less, preferably 30 parts by mass or less, more preferably 25 parts by mass or less, further more preferably 20 parts by mass or less with respect to 100 parts by mass of the total amount of the raw material of the water-soluble polymer.

In addition, in the raw material of the water-soluble polymer, a content ratio of the water-soluble and copolymerizable monomer is within a range in which water solubility of the water-soluble polymer is maintained, and is, for example, 37 parts by mass or less, preferably 15 parts by mass or less, and 0 parts by mass or more, particularly preferably 0 parts by mass with respect to 100 parts by mass of the total amount of the raw material of the water-soluble polymer.

In other words, the raw material of the water-soluble polymer may be a composition consisting of the methacrylamide and the carboxy group-containing vinyl monomer without containing the water-soluble and copolymerizable monomer, or may be a composition consisting of the methacrylamide, the carboxy group-containing vinyl monomer, and the water-soluble and copolymerizable monomer.

Preferably, the raw material of the water-soluble polymer is a composition consisting of the methacrylamide and the carboxy group-containing vinyl monomer.

Then, the above-described raw material of the water-soluble polymer is polymerized by a known method, thereby obtaining a water-soluble polymer.

More specifically, for example, the raw material of the water-soluble polymer and a polymerization initiator are blended into water, the raw material of the water-soluble polymer is polymerized, and thereafter, if necessary, the polymerized product is matured.

The polymerization initiator is not particularly limited, and examples thereof include water-soluble initiators such as persulfate (ammonium persulfate, potassium persulfate, etc.), hydrogen peroxide, organic hydroperoxide, and 4,4'-azobis(4-cyanovaleric acid) acid; oil-soluble initiators such as benzoyl peroxide and azobisisobutyronitrile; and further, redox-based initiators.

These polymerization initiators may be used alone or in combination of two or more.

As the polymerization initiator, preferably, a water-soluble initiator is used, more preferably, persulfate is used, further more preferably, ammonium persulfate is used.

A mixing ratio of the polymerization initiator is, for example, 0.01 parts by mass or more, preferably 0.1 parts by mass or more, more preferably 0.2 parts by mass or more, further more preferably 0.25 parts by mass or more, and for example, 3 parts by mass or less, preferably 2 parts by mass or less with respect to 100 parts by mass of the raw material of the water-soluble polymer from the viewpoint of adjusting a weight average molecular weight of the water-soluble polymer within a range to be described later.

The polymerization conditions and the maturing conditions are appropriately set so that the weight average molecular weight of the water-soluble polymer to be obtained is within a range to be described later.

More specifically, a polymerization temperature is, for example, 30° C. or more, preferably 50° C. or more, and for example, 95° C. or less, preferably 85° C. or less under a normal pressure. Further, the polymerization time is, for example, 0.5 hours or more, preferably 1.5 hours or more, and for example, 20 hours or less, preferably 10 hours or less.

The maturing time is, for example, 0.5 hours or more, preferably 1.5 hours or more, and for example, 6 hours or less, preferably 3 hours or less.

In addition, in the above-described polymerization, from the viewpoint of improving production stability, for example, a known additive may be blended at an appropriate ratio. Examples of the known additive include pH adjusting agents, metal ion sealing agents such as ethylenediaminetetraacetic acid and a salt thereof, and molecular weight adjusting agents (chain transfer agent) such as mercaptans and low molecular halogen compounds.

Further, before or after the above-described polymerization, a neutralizing agent such as ammonia may be blended, and a pH may be adjusted within a range of 7 or more and 11 or less.

Thus, the water-soluble polymer is obtained as the polymer of the raw material of the water-soluble polymer.

As a result, the water-soluble polymer, and an aqueous solution (ingredient for a secondary cell separator coating material) containing the water-soluble polymer are obtained.

Since the obtained water-soluble polymer has a repeating unit derived from the methacrylamide and a repeating unit derived from the carboxy group-containing vinyl monomer, the water-soluble polymer has relatively hydrophilicity with respect to a non-water-soluble polymer to be described later.

A content ratio of the repeating unit derived from the methacrylamide in the water-soluble polymer is the same as the content ratio of the methacrylamide in the raw material of the water-soluble polymer.

In other words, the content ratio of the repeating unit derived from the methacrylamide is 60% by mass or more, preferably 70% by mass or more, more preferably 75% by mass or more, further more preferably 80% by mass or more, and 97% by mass or less, preferably 96% by mass or less, more preferably 95% by mass or less with respect to the total amount of the water-soluble polymer from the viewpoint of improving adsorption properties with respect to an inorganic filler to be described later and obtaining excellent heat resistance.

Further, a content ratio of the repeating unit derived from the carboxy group-containing vinyl monomer in the water-soluble polymer is the same as the content ratio of the carboxy group-containing vinyl monomer in the raw material of the water-soluble polymer.

In other words, the content ratio of the repeating unit derived from the carboxy group-containing vinyl monomer is, from the viewpoint of improving adsorption properties with respect to an inorganic filler to be described later and obtaining excellent heat resistance, 3% by mass or more, preferably 4% by mass or more, more preferably 5% by mass or more, and from the viewpoint of suppressing adsorption with respect to a substrate to be described later and obtaining excellent heat resistance, 40% by mass or less, preferably 30% by mass or less, more preferably 25% by mass or less, further more preferably 20% by mass or less with respect to the total amount of the water-soluble polymer.

Also, the water-soluble polymer may contain the repeating unit derived from the above-described water-soluble and copolymerizable monomer.

A content ratio of the repeating unit derived from the water-soluble and copolymerizable monomer in the water-soluble polymer is the same as the content ratio of the water-soluble and copolymerizable monomer in the raw material of the water-soluble polymer.

In other words, the content ratio of the repeating unit derived from the water-soluble and copolymerizable monomer is, for example, 0% by mass or more, and for example, 27% by mass or less, preferably 15% by mass or less, particularly preferably 0% by mass with respect to the total amount of the water-soluble polymer.

In addition, the weight average molecular weight of the water-soluble polymer is, from the viewpoint of suppressing permeation of pores of a porous film to be described later and obtaining excellent air permeability, 20000 or more, preferably 30000 or more, more preferably 40000 or more, and from the viewpoint of obtaining excellent heat resistance, 200000 or less, preferably 180000 or less, more preferably 150000 or less.

The weight average molecular weight is a molecular weight in terms of polystyrene by gel permeation chromatogram. The weight average molecular weight is measured in conformity with Examples to be described later.

In addition, a glass transition temperature of the water-soluble polymer is, from the viewpoint of obtaining excellent heat resistance, 200° C. or more, preferably 210° C. or more, more preferably 220° C. or more, further more preferably 230° C. or more, further more preferably 240° C. or more, and usually 400° C. or less, preferably 300° C. or less, more preferably 280° C. or less.

The glass transition temperature is calculated by a formula of FOX (hereinafter, the same).

In addition, in the aqueous solution of the water-soluble polymer, the water-soluble polymer content (solid content concentration) is, for example, 3% by mass or more, preferably 5% by mass or more, more preferably 8% by mass or more, and for example, 50% by mass or less, preferably 30% by mass or less.

Further, a pH value of the aqueous solution is, for example, 5 or more, and for example, 9 or less.

When the above-described pH value is within the above-described range, storage stability is improved.

Further, the ingredient for a secondary cell separator coating material may include, as an optional component, a non-water-soluble polymer.

The non-water-soluble polymer is a polymer obtained by polymerizing a raw material of the non-water-soluble polymer (monomer composition).

The non-water-soluble polymer is defined as a polymer having a residual solid content of 90% or more which is obtained by stirring and dissolving 1 g of polymer with respect to 100 ml of water for 24 hours to be then filtered through a 300-mesh wire net.

The raw material of the non-water-soluble polymer contains, for example, alkyl (meth)acrylate.

An example of the alkyl (meth)acrylate includes the above-described alkyl (meth)acrylate.

Further, the raw material of the non-water-soluble polymer may contain a copolymerizable monomer which is copolymerizable with the alkyl (meth)acrylate (hereinafter, referred to as a non-water-soluble and copolymerizable monomer).

Examples of the non-water-soluble and copolymerizable monomer include functional group-containing vinyl monomers.

Examples of the functional group-containing vinyl monomer include the above-described carboxy group-containing vinyl monomers, the above-described hydroxyl group-containing vinyl monomers, the above-described amino group-containing vinyl monomers, the above-described glycidyl group-containing vinyl monomers, the above-described cyano group-containing vinyl monomers, the above-described sulfonic acid group-containing vinyl monomers, and a salt of these, the above-described acetoacetoxy group-containing vinyl monomers, and phosphoric acid group-containing compounds. Further, examples of the non-water-soluble and copolymerizable monomer include the above-described vinyl esters, the above-described aromatic vinyl monomers, the above-described N-substituted unsaturated carboxylic acid amides, acrylamides and/or methacrylamides, the above-described heterocyclic vinyl compounds, the above-described vinylidene halide compounds, the above-described α-olefins, the above-described dienes, and the above-described cross-linking vinyl monomers.

These non-water-soluble and copolymerizable monomers may be used alone or in combination of two or more. A content ratio of the non-water-soluble and copolymerizable monomer is appropriately set in accordance with its purpose and application.

Then, the above-described raw material of the non-water-soluble polymer is polymerized in water by a known method, thereby obtaining a non-water-soluble polymer and a dispersion liquid thereof.

The non-water-soluble polymer has relatively hydrophobicity with respect to the above-described water-soluble polymer.

A glass transition temperature of the non-water-soluble polymer is, for example, −30° C. or more, preferably −20° C. or more, preferably −15° C. or more, and for example, 80° C. or less, preferably 50° C. or less.

When the ingredient for a secondary cell separator coating material contains the non-water-soluble polymer, the ingredient for a secondary cell separator coating material may be a composite resin (for example, resin particles) containing the water-soluble polymer and the non-water-soluble polymer, may be a dispersion liquid obtained by polymerizing the raw material of the water-soluble polymer in the presence of the non-water-soluble polymer, and further, may be a dispersion liquid obtained by polymerizing the raw material of the non-water-soluble polymer in the presence of the water-soluble polymer. Further, the ingredient for a secondary cell separator coating material may be, for example, a liquid mixture of an aqueous solution of the water-soluble polymer and a dispersion liquid of the non-water-soluble polymer which are obtained individually.

When the ingredient for a secondary cell separator coating material is the aqueous solution and/or the dispersion liquid, a pH value thereof is, for example, 5 or more, and for example, 9 or less.

When the above-described pH value is within the above-described range, the storage stability is improved.

In addition, in the aqueous solution and/or the dispersion liquid, the resin content (solid content concentration) is, for example, 5% by mass or more, and for example, 50% by mass or less.

The above-described ingredient for a secondary cell separator coating material includes the water-soluble polymer having the repeating unit derived from the methacrylamide and the repeating unit derived from the carboxy group-containing vinyl monomer at a predetermined ratio, and the weight average molecular weight and the glass transition temperature of the water-soluble polymer are adjusted within a predetermined range. Therefore, according to the above-described ingredient for a secondary cell separator coating material, it is possible to obtain the secondary cell separator having excellent heat resistance and air permeability.

In other words, in the secondary cell separator coating material (described later), the water-soluble polymer is adsorbed on the inorganic filler (described later), and the water-soluble polymer binds the inorganic filler (described later), thereby improving the heat resistance.

In this regard, when an amount of repeating units derived from the methacrylamide in the water-soluble polymer is excessively small, binding properties of the water-soluble polymer with respect to the inorganic filler (described later) are not sufficient, and the heat resistance cannot be sufficiently obtained.

In addition, when the amount of repeating units derived from the methacrylamide in the water-soluble polymer is excessively large, an amount of repeating units derived from the carboxy group-containing vinyl monomer in the water-soluble polymer becomes small.

Then, for example, when the amount of repeating units derived from the carboxy group-containing vinyl monomer in the water-soluble polymer is excessively small, the adsorption properties of the water-soluble polymer with respect to the inorganic filler (described later) are not sufficient, and the heat resistance cannot be sufficiently obtained.

In addition, when the amount of repeating units derived from the carboxy group-containing vinyl monomer in the water-soluble polymer is excessively large, an amount of adsorption of the water-soluble polymer with respect to a substrate becomes large, so that the air permeability of the separator is lowered.

Further, for example, when the glass transition temperature of the water-soluble polymer is excessively low, the heat resistance of the separator decreases.

In addition, for example, when the weight average molecular weight of the water-soluble polymer is excessively small, the water-soluble polymer penetrates into the pores of the porous film to be described later, thereby decreasing the air permeability of the separator.

In addition, for example, when the weight average molecular weight of the water-soluble polymer is excessively large, coating workability of the water-soluble polymer decreases due to thickening, and the coating film becomes uneven, so that the heat resistance of the separator decreases.

On the other hand, when each of the content ratio of the repeating unit derived from the methacrylamide, the content ratio of the repeating unit derived from the carboxy group-containing vinyl monomer, the weight average molecular weight, and the glass transition temperature is adjusted within a predetermined range, it is possible to obtain excellent heat resistance and air permeability in good balance.

The secondary cell separator coating material of the present invention includes the above-described ingredient for a secondary cell separator coating material, and if necessary, an inorganic filler and a dispersant.

A mixing ratio of the ingredient for a secondary cell separator coating material is the total amount of the ingredient for a secondary cell separator coating material, the inorganic filler, and the dispersant (hereinafter, referred to as a coating material component for a secondary cell separator).

The mixing ratio of the ingredient for a secondary cell separator coating material is, for example, 0.1 parts by mass or more (solid content), and for example, 10 parts by mass or less (solid content) with respect to 100 parts by mass of the total amount of the ingredient for a secondary cell separator coating material, the inorganic filler, and the dispersant (solid content).

Examples of the inorganic filler include oxides such as alumina, silica, titania, zirconia, magnesia, ceria, yttria, zinc oxide, and iron oxide; nitrides such as silicon nitride, titanium nitride, and boron nitride; carbides such as silicon carbide and calcium carbonate; sulfates such as magnesium sulfate and aluminum sulfate; hydroxides such as aluminum hydroxide and aluminum hydroxide oxide; silicates such as talc, kaolinite, dickite, nacrite, halloysite, pyrophyllite, montmorillonite, sericite, mica, amesite, bentonite, asbestos, zeolite, calcium silicate, magnesium silicate, diatomous earth, silica sand, and glass; and potassium titanate. Preferably, oxides and hydroxides are used, more preferably, aluminum oxide and aluminum hydroxide oxide are used.

A mixing ratio of the inorganic filler is, for example, 50 parts by mass or more (solid content), and for example, 99.7 parts by mass or less (solid content) with respect to 100 parts by mass (solid content) of the coating material component for a secondary cell separator.

Examples of the dispersant include ammonium polycarboxylate and sodium polycarboxylate.

When the dispersant is the ammonium polycarboxylate, it is possible to uniformly disperse the above-described ingredient for a secondary cell separator coating material and the inorganic filler, and obtain a coating film (described later) having a uniform thickness.

A mixing ratio of the dispersant is, for example, 0.1 parts by mass or more (solid content) and for example, 5 parts by mass or less (solid content) with respect to 100 parts by mass (solid content) of the coating material component for a secondary cell separator.

In order to obtain the secondary cell separator coating material, first, an inorganic filler and a dispersant are blended into water at the above-described ratio, thereby preparing an inorganic filler dispersion liquid.

Then, the ingredient for a secondary cell separator coating material (or a dispersion liquid containing the ingredient for a secondary cell separator coating material) is blended into the inorganic filler dispersion liquid at the above-described ratio to be stirred.

A stirring method is not particularly limited, and an example thereof includes mechanical stirring with ball mills, bead mills, planetary ball mills, vibrating ball mills, sand mills, colloid mills, attritors, roll mills, high-speed impeller dispersion, dispersers, homogenizers, high-speed shock mills, ultrasonic dispersion, and stirring blades.

Thus, the secondary cell separator coating material is obtained.

Also, the secondary cell separator coating material is obtained as a dispersion liquid in which the secondary cell separator coating material is dispersed in water.

In addition, if necessary, an additive may be blended into the secondary cell separator coating material at an appropriate ratio. Examples of the additive include hydrophilic resins, thickeners, wetting agents, defoaming agents, and PH adjusting agents.

These additives may be used alone or in combination of two or more.

Since the above-described secondary cell separator coating material includes the above-described ingredient for a secondary cell separator coating material, it is possible to obtain a secondary cell separator having excellent heat resistance and air permeability.

Then, the secondary cell separator coating material can be preferably used as a coating material for a secondary cell separator.

The secondary cell separator of the present invention can be produced by a production method including a step of preparing a porous film and a step of coating the above-described coating material for a separator onto at least one surface of the porous film.

In the step of preparing the porous film, the porous film is prepared.

Examples of the porous film include polyolefin porous films such as polyethylene and polypropylene and aromatic polyamide porous films, and preferably, a polyolefin porous film is used. The porous film may be subjected to surface treatment if necessary. Examples of the surface treatment include corona treatment and plasma treatment.

A thickness of the porous film is, for example, 1 μm or more, preferably 5 μm or more, and for example, 40 μm or less, preferably 20 μm or less.

Next, in the step of coating the above-described coating material for a separator onto at least one surface of the porous film, a dispersion liquid of the above-described coating material for a separator is coated onto at least one surface of the porous film, and then, if necessary, it is dried, thereby obtaining a coating film.

A coating method is not particularly limited, and examples thereof include gravure coater methods, small diameter gravure coater methods, reverse roll coater methods, transfer roll coater methods, kiss coater methods, dip coater methods, micro gravure coater methods, knife coater methods, air doctor coater methods, blade coater methods, rod coater methods, squeeze coater methods, cast coater methods, dye coater methods, screen printing methods, and spray coating methods.

As the drying conditions, a drying temperature is, for example, 40° C. or more, and for example, 80° C. or less.

A thickness of the coating film is, for example, 1 μm or more, preferably 3 μm or more, and for example, 10 μm or less, preferably 8 μm or less.

Thus, the secondary cell separator including the porous film, and the coating film of the above-described secondary cell separator coating material disposed on at least one surface of the porous film is produced.

In the above-described description, the coating film of the secondary cell separator coating material is disposed on at least one surface of the porous film. Alternatively, the above-described coating film can be also disposed on both surfaces of the porous film.

Since the above-described secondary cell separator includes the coating film of the above-described secondary cell separator coating material, it has excellent heat resistance and air permeability.

According to the above-described method for producing a secondary cell separator, it is possible to efficiently produce the secondary cell separator having excellent heat resistance and air permeability.

Then, the secondary cell separator can be preferably used as the separator for a secondary cell.

The secondary cell of the present invention includes a positive electrode, a negative electrode, the above-described secondary cell separator which is disposed between the positive electrode and the negative electrode, and an electrolyte which is impregnated into the positive electrode, the negative electrode, and the above-described secondary cell separator.

An example of the positive electrode includes a known electrode including a positive electrode collector and a positive electrode active material which is laminated on the positive electrode collector.

Examples of the positive electrode collector include electrically conductive materials such as aluminum, titanium, stainless steel, nickel, calcined carbon, electrically conductive polymers, and electrically conductive glass.

The positive electrode active material is not particularly limited, and examples thereof include known positive electrode active materials such as lithium-containing transition metal oxide, lithium-containing phosphate, and lithium-containing sulfate.

These positive electrode active materials may be used alone or in combination of two or more.

An example of the negative electrode includes a known electrode including a negative electrode collector and a negative electrode active material which is laminated on the negative electrode collector.

Examples of the negative electrode collector include electrically conductive materials such as copper and nickel.

The negative electrode active material is not particularly limited, and examples thereof include carbon active materials such as graphite, soft carbon, and hard carbon.

These negative electrode active materials may be used alone or in combination of two or more.

When a lithium ion cell is used as a secondary cell, an example of the electrolyte includes a solution in which a lithium salt is dissolved in a carbonate compound such as ethylene carbonate (EC), propylene carbonate (PC), and ethyl methyl carbonate (EMC).

Then, in order to produce the secondary cell, for example, the separator of the secondary cell is sandwiched between the positive electrode and the negative electrode to be housed in a cell casing (cell), and the electrolyte is injected into the cell casing.

Thus, the secondary cell can be obtained.

Since the above-described secondary cell includes the above-described secondary cell separator, it has excellent heat resistance and air permeability, and as a result, it has excellent durability and power generation efficiency.

EXAMPLES

The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS". All designations of "part" or "parts" and "%" mean part or parts by mass and % by mass, respectively, unless otherwise particularly specified in the following description.

1. Preparation of Ingredient for Secondary Cell Separator Coating Material

Production Example 1

A separable flask equipped with a stirrer and a reflux condenser was charged with 392.0 parts of distilled water to be replaced with nitrogen gas, and then, the charged product was heated to 80° C. Then, 0.6 parts of ammonium persulfate was added, thereafter, the following monomer compositions were continuously added over a period of three hours, and the mixture was further held for three hours to adjust a pH thereof to 9.0 with ammonia water. In this way, the polymerization was completed. An appropriate amount of water was added, thereby obtaining an aqueous solution of a water-soluble polymer having the solid content of 15.0%.

Methacrylamide: 95.0 parts

Methacrylic acid: 5.0 parts

25% ammonia water: 5.0 parts

Distilled water: 500.0 parts

Further, a weight average molecular weight of the water-soluble polymer contained in the obtained aqueous solution was determined using a GPC device (device name: P KP-22, manufactured by FLOM Corporation).

The measurement conditions were as follows, and the weight average molecular weight was determined in terms of standard polyethylene glycol/polyethylene oxide.

Sample concentration: 0.1 (w/v) %

Sample injection volume: 100 μL

Eluent: 0.2 M $NaNO_3$/acrylonitrile (AN)=90/10

Flow rate: 1.0 ml/min

Measurement temperature: 40° C.

Column: ShodexohPAK SB-806M HQ×2

Further, the glass transition temperature (Tg) of the water-soluble polymer contained in the obtained aqueous solution was calculated by the following FOX formula.

$$1/Tg=W_1/Tg_1+W_2/Tg_2+\ldots+W_n/Tg_n \quad (1)$$

[In formula, Tg represents the glass transition temperature of the copolymer (unit: K), $Tg_i$ (i=1, 2, . . . n) represents the glass transition temperature (unit: K) when the monomer i forms a single polymer, and $W_1$ (i=1, 2, . . . n) represents a mass fraction in the total monomer of the monomer i.]

Production Examples 2 to 5, and Production Comparative Examples 1 to 6

An ingredient for a separator coating material was produced in the same manner as in Production Example 1, except that the mixing formulation was changed in accordance with the description of Table 1. In addition, the weight average molecular weight of the water-soluble polymer was measured, and the glass transition temperature of the water-soluble polymer was calculated in the same manner as in Production Example 1.

2. Production of Secondary Cell Separator Coating Material and Secondary Cell Separator

Example 1

As a pigment, 100 parts by mass of aluminum hydroxide oxide (manufactured by TAIMEI CHEMICALS Co., Ltd., Boehmite GradeC06, particle size: 0.7 μm) and as a dispersant, 3.0 parts by mass (in terms of solid content) of an aqueous solution of ammonium polycarboxylate (manufactured by SAN NOPCO LIMITED, SN Dispersant 5468) were uniformly dispersed in 110 parts by mass of water, thereby obtaining a pigment dispersion liquid. Then, the aqueous solution produced in Production Example 1 was added to the pigment dispersion liquid so as to be 5 parts by mass in terms of solid content. Further, water was added and adjusted so as to have the solid content of 40%, and stirred for 15 minutes, thereby preparing a secondary cell separator coating material.

On the other hand, the surface of the polyolefin resin porous film was subjected to corona treatment. More specifically, as a polyolefin resin porous film, part number of SW509C+ (film thickness of 9.6 μm, porosity of 40.6%, air permeability of 158 g/100 ml, surface density of 5.5 $g/m^2$, manufactured by Changzhou Senior New Energy Materials Co., Ltd.) was prepared. Next, the surface of the polyolefin resin porous film was cut into an A4 size, and thereafter, the surface of the polyolefin resin porous film was subjected to corona treatment with a switch-back automated running corona surface treatment device (manufactured by WEDGE CO., LTD.) under the conditions of an output of 0.15 KW, a conveyance rate of 3.0 m/s×2 times, and a corona discharge distance of 9 mm.

Then, the above-described secondary cell separator coating material was coated onto the surface of the polyolefin resin porous film which was subjected to the corona treatment using a wire bar. After the coating, the obtained coated product was dried at 50° C., thereby forming a coating film having a thickness of 5 μm on the surface of the polyolefin resin porous film.

Thus, the secondary cell separator was produced.

Examples 2 to 5 and Comparative Examples 1 to 6

A secondary cell separator was produced in the same manner as in Example 1, except that an aqueous solution produced in Production Examples 2 to 5 and Production Comparative Examples 1 to 6 was used instead of the aqueous solution produced in Production Example 1.

Comparative Example 7

A secondary cell separator was produced in the same manner as in Example 1, except that sodium carboxymethyl cellulose (CMC, manufactured by DKS Co., Ltd., trade name: CELLOGEN 3H, weight average molecular weight of about 110000) was used instead of the aqueous solution produced in Production Example 1.

3. Evaluation (Heat Resistance)

Each of the secondary cell separators of Examples and Comparative Examples was cut into pieces having a size of 5 cm×5 cm to be used as test pieces. After the test pieces were left to stand in an oven at 150° C. for one hour, a length of each side was measured, and a thermal shrinkage rate was calculated. The superiority and inferiority of the heat resistance was evaluated in accordance with the following criteria. The results are shown in Table 1.

A: thermal shrinkage rate was below 15%.

B: thermal shrinkage rate was 15% or more and below 25%.

C: thermal shrinkage rate was 25% or more and below 60%.

D: thermal shrinkage rate was 60% or more.

(Ion Permeability)

The air permeability resistance of each of the secondary cell separators of Examples and Comparative Examples was obtained by measurement in conformity with JIS-P-8117 with an Oken-type air permeability-smoothness tester manufactured by ASAHI SEIKO CO., LTD. It was evaluated that the smaller the air permeability resistance was, the more excellent the ion permeability was. Also, the superiority and inferiority of the ion permeability was evaluated in accordance with the following criteria. The results are shown in Table 1.

A: air permeability resistance was below 180 s/100 mL.

B: air permeability resistance was 180 s/100 mL or more and below 220 s/100 mL.

C: air permeability resistance was 220 s/100 mL or more and below 300 s/100 mL.

D: air permeability resistance was 300 s/100 mL or more.

TABLE 1

| No. | Raw Material of Water-Soluble Polymer (% by mass) Mam | Mac | HEMA | AM | Water-Soluble Polymer Mw | Tg | No. | Evaluation Heat Resistance | Air Permeability |
|---|---|---|---|---|---|---|---|---|---|
| Production Ex. 1 | 95 | 5 | — | — | 90000 | 252° C. | Ex. 1 | A | A |
| Production Ex. 2 | 80 | 20 | — | — | 170000 | 240° C. | Ex. 2 | A | A |
| Production Ex. 3 | 90 | 5 | 5 | — | 50000 | 236° C. | Ex. 3 | A | A |
| Production Ex. 4 | 65 | 35 | | | 190000 | 229° C. | Ex. 4 | A | B |
| Production Ex. 5 | 95 | 5 | | | 30000 | 252° C. | Ex. 5 | A | B |
| Production Comparative Ex. 1 | — | 5 | — | 95 | 65000 | 155° C. | Comparative Ex. 1 | D | A |
| Production Comparative Ex. 2 | — | 30 | — | 70 | 72000 | 162° C. | Comparative Ex. 2 | D | A |
| Production Comparative Ex. 3 | 100 | — | — | — | 80000 | 256° C. | Comparative Ex. 3 | D | C |
| Production Comparative Ex. 4 | 55 | 45 | — | — | 180000 | 222° C. | Comparative Ex. 4 | B | B |
| Production Comparative Ex. 5 | 95 | 5 | — | — | 5000 | 252° C. | Comparative Ex. 5 | D | D |
| Production Comparative Ex. 6 | 95 | 5 | — | — | 250000 | 252° C. | Comparative Ex. 6 | C | A |
| Production Comparative Ex. 7 | Carboxymethyl Cellulose | | | | 110000 | — | Comparative Ex. 7 | A | C |

The details of abbreviations in Table are described below.

Mam: methacrylamide

Mac: methacrylic acid

HEMA: 2-hydroxyethyl methacrylate

AM: acrylamide

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The secondary cell separator coating material of the present invention is preferably used in various industrial fields requiring secondary cells.

The invention claimed is:

1. An ingredient for a secondary cell separator coating material comprising:

a water-soluble polymer having a repeating unit derived from methacrylamide and a repeating unit derived from a carboxy group-containing vinyl monomer without having a repeating unit derived from acrylamide, wherein the carboxy group-containing vinyl monomer is methacrylic acid;

a content ratio of the repeating unit derived from the methacrylamide is more than 80% by mass and 97% by mass or less, and a content ratio of the repeating unit derived from the carboxy group-containing vinyl monomer is 3% by mass or more and 10% by mass or less with respect to the total amount of the water-soluble polymer;

a weight average molecular weight of the water-soluble polymer is 20000 or more and 90000 or less; and a glass transition temperature of the water-soluble polymer is 200° C. or more.

2. A secondary cell separator coating material comprising:

the ingredient for a secondary cell separator coating material according to claim 1.

3. The secondary cell separator coating material according to claim 2 further comprising:

an inorganic filler and a dispersant.

4. A secondary cell separator comprising:

a porous film and a coating film of the secondary cell separator coating material according to claim 2 disposed on at least one surface of the porous film.

5. A method for producing a secondary cell separator comprising:

a step of preparing a porous film and a step of coating the secondary cell separator coating material according to claim 2 onto at least one surface of the porous film.

6. A secondary cell comprising:

a positive electrode, a negative electrode, and the secondary cell separator according to claim 4 disposed between the positive electrode and the negative electrode.

7. The ingredient for a secondary cell separator coating material according to claim 1, wherein the content ratio of the repeating unit derived from the methacrylamide is 95% by mass or less, and the content ratio of the repeating unit derived from the carboxy group-containing vinyl monomer is 5% by mass or more with respect to the total amount of the water-soluble polymer; and the weight average molecular weight of the water-soluble polymer is 30000 or more and 90000 or less.

8. The ingredient for a secondary cell separator coating material according to claim 1, wherein the glass transition temperature of the water-soluble polymer is 200° C. or more and 280° C. or less.

9. The ingredient for a secondary cell separator coating material according to claim 1, wherein the content ratio of the repeating unit derived from the methacrylamide is 90% by mass or more and 97% by mass or less.

* * * * *